(12) United States Patent
Voronov

(10) Patent No.: US 6,942,729 B2
(45) Date of Patent: Sep. 13, 2005

(54) HIGH PRESSURE AND HIGH TEMPERATURE APPARATUS

(75) Inventor: Oleg A. Voronov, East Stroudsburg, PA (US)

(73) Assignee: Diamond Materials, INC, Piscataway, NJ (US)

( * ) Notice: Subject to any disclaimer, the term of this patent is extended or adjusted under 35 U.S.C. 154(b) by 162 days.

(21) Appl. No.: 10/362,320

(22) PCT Filed: Aug. 16, 2001

(86) PCT No.: PCT/US01/41745

§ 371 (c)(1), (2), (4) Date: Feb. 20, 2003

(87) PCT Pub. No.: WO02/16676

PCT Pub. Date: Feb. 28, 2002

(65) Prior Publication Data

US 2003/0154913 A1 Aug. 21, 2003

Related U.S. Application Data

(60) Provisional application No. 60/226,318, filed on Aug. 21, 2000.

(51) Int. Cl.⁷ ............................ C30B 28/04; C30B 29/04
(52) U.S. Cl. ......................................... 117/68; 264/434
(58) Field of Search ............................. 264/434; 117/68

(56) References Cited

U.S. PATENT DOCUMENTS

| | | | | | |
|---|---|---|---|---|---|
| 2,941,248 | A | * | 6/1960 | Howard | 425/77 |
| 3,746,484 | A | * | 7/1973 | Vereschagin et al. | 425/77 |
| 6,395,214 | B1 | * | 5/2002 | Kear et al. | 264/434 |

* cited by examiner

*Primary Examiner*—Felisa Hiteshew
(74) *Attorney, Agent, or Firm*—William L. Botjer

(57) ABSTRACT

A design for high pressure/high temperature apparatus and reaction cell to achieve ~30 GPa pressure in ~1 cm volume and ~100 GPa pressure in ~1 mm volumes and 20–5000° C. temperatures in a static regime. The device includes profiled anvils (28) action on a reaction cell (14, 16) containing the material (26) to be processed. The reaction cell includes a heater (18) surrounded by insulating layers and screens. Surrounding the anvils are cylindrical inserts and supporting rings (30–48) whose hardness increases towards the reaction cell. These volumes may be increased considerably if applications require it, making use of presses that have larger loading force capability, larger frames and using larger anvils.

18 Claims, 5 Drawing Sheets

HIGH PRESSURE AND HIGH TEMPERATURE APPARATUS

CROSS REFERENCE TO RELATED APPLICATIONS

This application claims the benefit of the filing date of U.S. provisional patent application Ser. No. 60/226,318 filed Aug. 21, 2000.

STATEMENT OF GOVERNMENT SUPPORT OF THIS INVENTION

This invention was supported under the Department of Energy, Grant No, DE-FG02-96ER 82154

BACKGROUND AND SUMMARY OF THE INVENTION

This invention relates to apparatus for providing high pressure and temperature for use in the formation of minerals and new materials.

Conventional high pressure units enable pressures of ~15 GPa (using WC/Co anvils) and ~100 GPa (for diamond anvils) in a working volume of ~1 $\mu m^3$, but with a limitation in temperature of about 2,000° C. However, if a reaction cell could be made with a larger working volume and even higher temperature capabilities, there is then the possibility of synthesizing diamonds directly from molten carbon in a relatively short time. Such synthesized diamond pieces will have fine grain size or single crystal structures, depending on the solidification rate.

Previous apparatus for achieving high pressures and temperatures may be found in: P. W. Bridgman *Scientific American*, Novermber 1955, p.42;. U.S. Pat. No. 2,941,248 to H. T. Hall "High temperature-high pressure apparatus"; and. U.S. Pat. No. 3,746,484 to L. F. Vereshchagin et al "Apparatus for achieving high pressure and high temperature".

FIG. 1 shows schematically the key components of the high pressure/high temperature apparatus of the present invention, and the corresponding reaction cell (which holds the material to be processed), designed and implemented for the hot-pressing of carbon-based and other materials. The high pressure/high temperature apparatus consists of two profiled anvils 1 and three supporting steel rings 2–4 supporting each anvil. The anvils 1 squeeze a container 5 made of plastic stone and a reaction cell 6 that resides within the container. Cylindrical inserts 7 and 8 are disposed above and below profiled anvils 1 and are constructed from WC/6 wt % Co, which are supported by steel rings which are described in detail with below. The hardness of the supporting rings decreases from the center of the apparatus to the periphery. Reaction cell 6 consists of a graphite crucible that serves as a heater when electrical current is passed therethrough.

Supporting steel rings are used to increase the allowed load exerted on the anvils and inserts. In effect, they provide side-supporting pressure, which increases the effective fracture strength of the anvils under compression. A set of such supporting rings is needed, since the maximal supporting pressure that a multilayer cylinder can bear is twice the maximum pressure that can be achieved in a monolayer cylinder:

$$P_{o(max)} \approx 2\sigma_{ts}/\sqrt{3} \tag{1}$$

where $\sigma_{ts}$ is the ultimate tensile strength of the steel. It is ~2.0 GPa for hardened steel. This scheme permits a maximal working pressure in the RC ($P_{Wmax}$) that is higher than the compressive fracture strength of the anvils; however, this pressure is always less than the Vickers hardness ($H_V$) of the anvils:

$$\sigma_{fs} \leq P_{Wmax} \leq H_V \tag{2}$$

The maximal working volume ($V_{max}$) that can be achieved under pressure depends on $\sigma_{fs}$, maximal loading force ($F_{max}$) of press, size of frame window ($a_f$) and size of anvils used ($V_a$):

$$V_{max} = V_{max}(\sigma_{fs}, F_{max}, a_f, V_a) \tag{3}$$

According to theory, the fracture compressive strength of a brittle material is inversely proportional to the sample volume:

$$\sigma_{fs} = \eta \sigma_{cs} V_a^{-\gamma} \tag{4}$$

where $\eta = \eta_0 V_{0a}^\gamma$ is constant, $\eta_0$ is dimensional constant that is typical of a given material, $V_{0a}$ is the volume of a standard sample for measuring compressive strength ($\sigma_{cs}$) and exponent $\gamma$ is a typical value for a given material ($\gamma \sim 1/15$ for regular WC/Co). The values of $\sigma_{cs}$ and $H_V$ in formula (2) are also interrelated. The $H_V^{st}$ is ~2.5$\sigma_{cs}^{st}$ for hardened steel that has some plasticity. The $H_V^{cer}$ is ~7$\sigma_{os}^{cer}$ for brittle rocks, stones and ceramics. The $H_V^{com}$ is about from 3 to 5$\sigma_{cs}^{st}$ for composite materials with brittle skeleton and plastic matrix, such as materials of the WC/Co type. The degree of sensitivity of the compressive fracture strength on sample volume depends on porosity, crystallite size, and value of side supporting pressure ($P_{ss}$):

$$\gamma = \gamma(\rho_A, d, P_{ss}) \tag{5}$$

where $\rho_A$ is apparent density, d is typical size of crystallites.

The high pressure/high temperature apparatus of the present invention enables a maximum possible static pressure over the range 1–100 GPa Hereafter, we will call the range 1–10 GPa "very high pressure" and the range 10–100 GPa "super high pressure". Even higher pressures in large volume can, in principle, be achieved with the help of dynamic methods. We will call this pressure range (P>100 GPa) "ultra high pressure".

Let us now consider how to achieve very high temperatures in the high pressure/high temperature apparatus. The necessary high temperature is best realized by passing an electric current directly through the graphite container. The thermal regime of the reaction cell and its container may be computed from the following equation:

$$Wdt = \int c\rho \cdot dT \cdot dV + (\oint \lambda \cdot \text{grad} T \cdot dS) dt \tag{6}$$

where W=qdV is power, q is power emitted in unit volume, c is specific heat capacity, $\rho$ is density, $\lambda$ is thermal conductivity. This equation in the static state may be represented as:

$$\text{div}(\lambda \cdot \text{grad} T) = 0 \tag{7}$$

An approximate solution of equation (6) for spherical thermal conductivity provides an opportunity to determine the thickness of thermal insulation and the relaxation time that is needed for the reaction cell to respond to a power change and to achieve steady state:

$$T = T_{\max}\left(1 - e^{-\frac{t}{\tau}}\right) \tag{8}$$

where $T_{\max} = W/v$; $\tau = \eta/v$;

$$v = \int div(\lambda grad\psi(r))dV;$$

$$\eta = \int c \cdot \rho\psi(r)dV;$$

and ψ(r) is a function typical of a specific container. If the energy released is not uniform over the entire volume of the sample, some interval of time will be necessary to heating the center of the sample to a temperature close to that of the heater, $T_{max}$. A typical relaxation time ($\tau_0$) depends on the materials properties and size of samples:

$$\tau_0 = \frac{1}{3}\frac{c_0\rho_0}{\lambda_0}r_0^2 \tag{9}$$

where $c_0$, $\rho_0$, $\lambda_0$ are heat capacity, density and thermal conductivity of sample and $r_0$ is radius of sample.

A temperature range of 100–2000° C. is achievable using graphite heaters. In the temperature range 2000–4000° C., the carbon does not melt, but reacts with all elements and compounds, with the exception of inert gases. The very high temperature range, up to 4000–5000° C., is difficult to obtain, especially under high pressure, because the efficiency of thermal insulation is limited.

Thermal flow from the heater is proportional to the first power of temperature, but thermal flow by radiation is proportional to the fourth power of temperature:

$$dE_e = \sigma^{ST}\oint \beta_T(r)\alpha_T(r)T^4 dSdt \tag{10}$$

where $\alpha_T$ is blackness, $\sigma^{ST}$ is Stefan-Boltzman constant, $\beta_T$ is integral coefficient of reflection of electromagnetic waves from the surface. The energy $dE_e$ added to the right side of eq. (6) increases the heat transfer at very high temperature and leads to a situation where a small increase in temperature demands a large increment in heater power.

The apparatus to be described below permits the achievement of static super high pressure in combination with static very high temperature.

BRIEF DESCRIPTION OF THE DRAWINGS

For a better understanding of the invention, reference is made to the following drawings which are to be taken in conjunction with the detailed description to follow in which.

DESCRIPTION OF THE PREFERRED EMBODIMENTS

Figure 1:
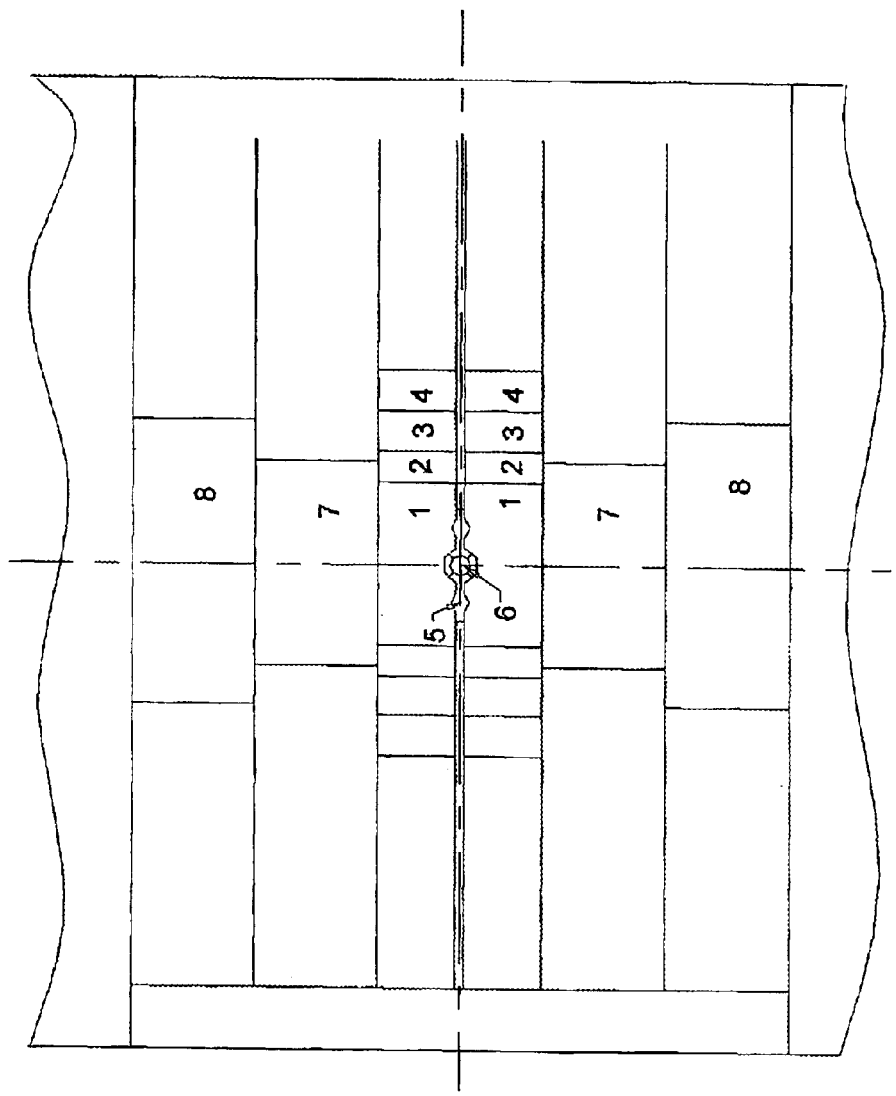
FIG. 1 illustrates the key components of the high pressure and temperature apparatus of the present invention.
Figure 2:
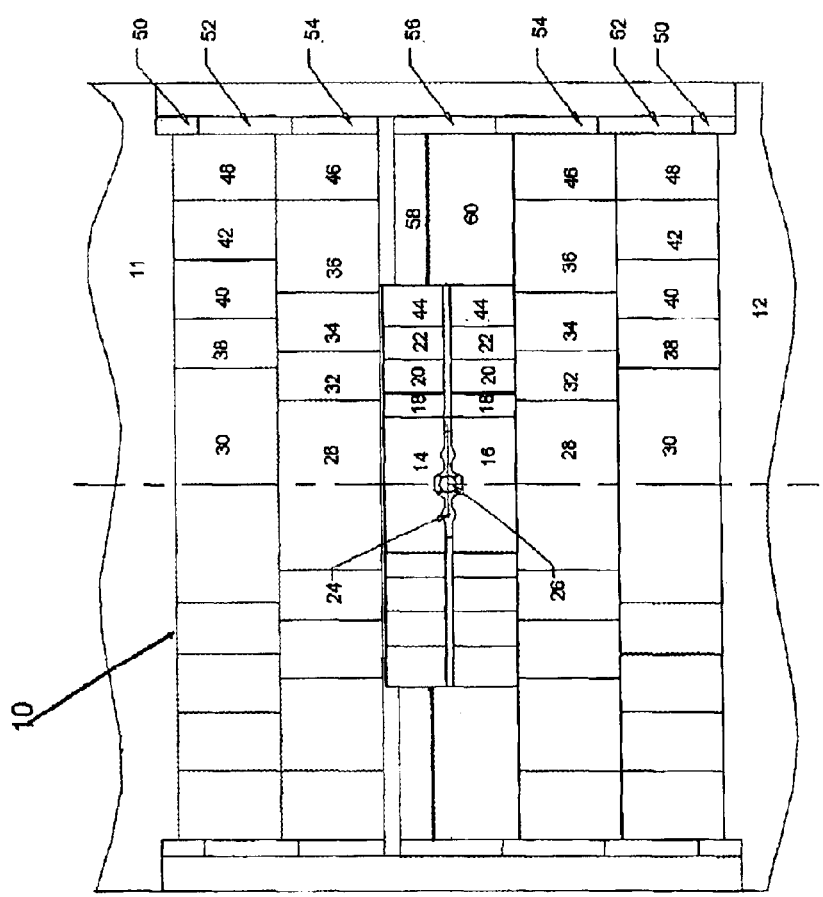
FIG. 2 illustrates in detail the high pressure and temperature apparatus of the present invention.

FIG. 2 illustrates the high pressure and temperature apparatus 10 of the present invention which is shown disposed between the upper 11 and lower 12 steel contact plates of a conventional hydraulic press. The central unit consists of upper and lower profiled anvils 14, 16 and supporting annular steel rings 18, 20, 22 which surround the periphery of each anvil 14, 16. Anvils 14, 16 press on a container 24 made of plastic stone and a reaction cell 26 that resides within container 24. Upper and lower intermediate cylindrical inserts 28 are disposed above and below profiled anvils 14, 16 and outer cylindrical inserts 30 are located between inserts 28 and contact plates 11 and 12 of the hydraulic press. The materials used to construct anvils 14, 16 and cylindrical inserts 28, 30 are chosen so that the hardness increases vertically towards reaction cell 26. Contact plates 11, 12 are made of soft steel, outer inserts 30 are constructed of hardened steel and intermediate inserts 28 are made of a hard alloy. Anvils 14, 16 are manufactured either from diamond (HK=100 GPa) or from carbides (TiC or SiC) with a hardness of HV=30 GPa. Profiled anvils made from fine-structured TiC can achieve a pressure of 30 GPa in a volume of ~1 cm³, and profiled anvils made from fine-structured Diamond can achieve a pressure of 100 GPa in a volume of ~1 mm³. The inserts and anvils thus form a pyramidal structure such that the pressure decreases from a maximum inside reaction cell 26 to a pressure of <1 GPa on the interface between the outer inserts 30 and the plates 11, 12 of soft steel. The above mentioned volumes may be increased by the use of a press with a larger frame, maximal loading force and larger anvils. The maximal loading force will rise as $F_{max} \sim P_{max} \cdot V^{2/3}$.

Container 24 of plastic stone is located between two profiled anvils 14, 16. Some part of the container flows out of the cavity to fill the clearance between the anvils when the loading force is increased, thus fixing the pressure gradient from maximum inside the reaction cell to ambient outside the container. The clearance between outer part of anvils 14, 16 and supporting rings 18, 20 and 22 may be vacuum, air (gas) or a polymeric material with high compressibility (such as rubber). Such a rubber ring placed around the container serves to regulate the pressure gradient. The hardness of the plastic stone of container 24 is 1 to 3 on the Mohs scale. It is generally the same for all volumes of containers or gradually decreases from the reaction cell to the periphery.

Anvils and inserts can be made from, for example, fine-structured W—C—Co, W—Ti—C—Co—Fe—Ni, Ti—C, Si—C, Si—W—Ti—C—Co—Fe—Ni, and C. In addition to the fact that the hardness of the anvils and the cylindrical inserts increases towards the reaction cell, the anvils themselves can have a functionally graded hardness, wherein the hardness gradually decreases from the portion contacting reaction cell 26 towards inserts 28. By way of example, profiled functionally graded anvils can be made from WC—TiC—Co alloy, where the quantity of TiC decreases from 100% on the side contacting reaction cell 26 to 5% on the outer part; with the corresponding Co content increasing up to 10% on the outer part of the cell. Such profiled anvils are capable of maintaining static pressure up to 100 GPa ( if the anvils are constructed of diamond) inside the reaction cell, with decrease to ambient pressure outside the reaction cell.

Steel annular support rings 32, 34, 36 surround the periphery of intermediate inserts 28 and steel annular support rings 38, 40 and. 42 surround the periphery of outer inserts 30. Support rings 18, 20, 22 which surround anvils 14, 16; support rings 32, 34, 36 which surround intermediate inserts 28 and support rings 38, 40, 42 which surround outer inserts 30 are made from hardened alloyed steel. The heat treatment of the support rings is done in such a way that hardness and ultimate tensile strength decrease from center to periphery, but the plasticity of the rings increases. The calculation of stresses in the rings is done so that all the rings work in the elastic range and the maximal stress in any one ring does not exceed the yield strength ($\sigma_{ys}$) of the material. Outer safety rings 44, 46, 48 are made from soft, non heat-treated steel. Centering rings 50, 52, 54, 56, 58 and 60 disposed outside safety rings 44, 46, 48 are made from non-conducting polymeric materials and are used for precisely locating the axes of top and bottom parts of the apparatus.

High pressure and temperature apparatus 10 has a cylindrical axis of symmetry with the top and bottom parts are electrically insulated from the press. As is seen, the hardness of the inserts and anvils increases in a vertical direction towards the reaction cell. Furthermore, the hardness of the supporting rings increases in the radial direction towards the reaction cell. The power supply is connected to the top and bottom parts of the high pressure and temperature apparatus 10 by copper cables. The electrical voltage can be applied to the top and bottom parts of the high pressure and temperature apparatus 10. The heater of the reaction cell is connected to the anvils by contacting units.

Figure 3:
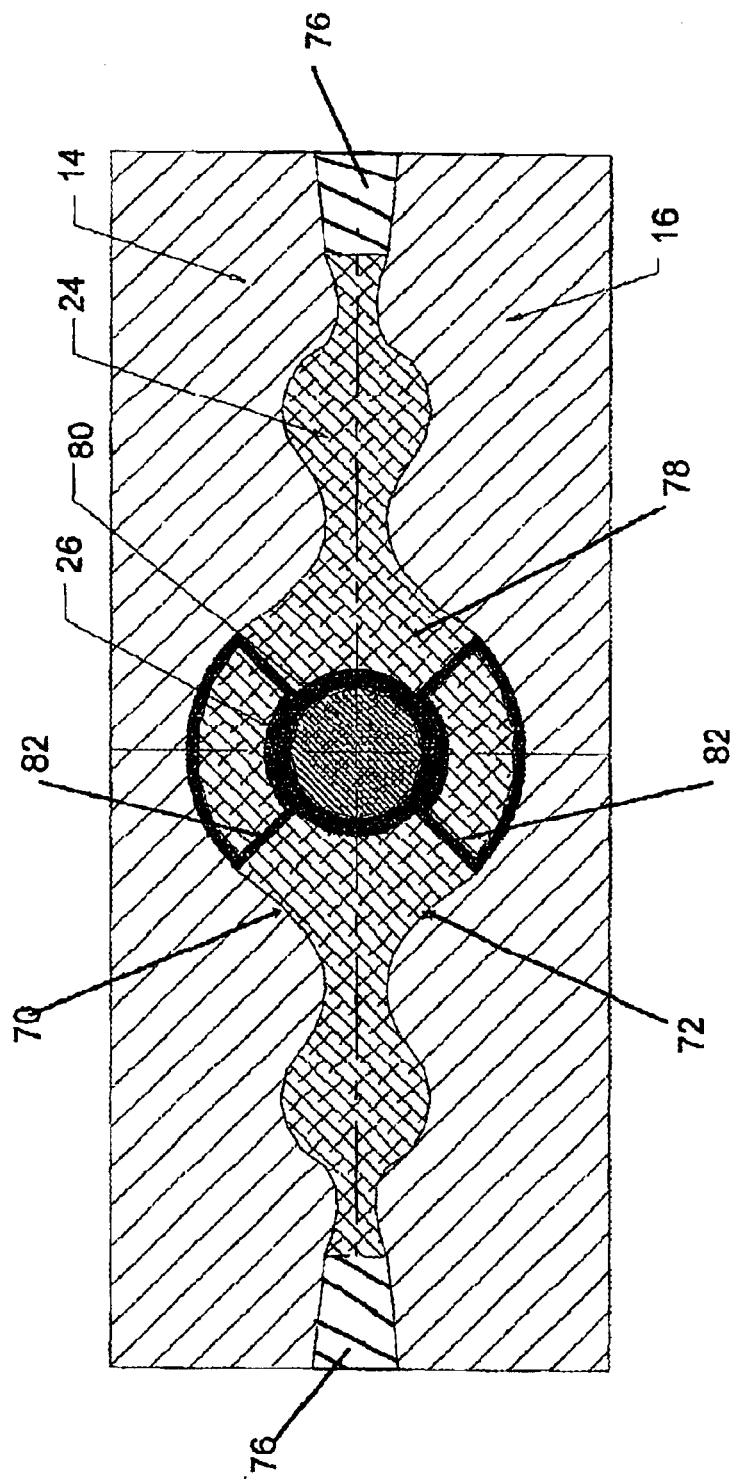
FIG. 3 is a sectional view of a reaction cell for use in the 20–2000° C. temperature range.

The details of a reaction cell 26 for material processing in the 20–2000° C. temperature range and its relationship to anvils 14, 16 is shown in FIG. 3. The profiled walls 70, 72 of anvils 14, 16 form container 24 in which reaction cell 26 is located together with "plastic stone" which is thermally and electrically non-conductive material which can be, for example fine limestone (calcite), pyrophyllite, talc, clay, gypsum, or combination of that, or a mixture of clay and sand, or other non conductive material. The edges of anvils 14, 16 can be sealed with an elastic, plastic or rubber ring 76. The profiled walls 70, 72 of anvils 14, 16 form a central cavity 78 for receiving reaction cell 26 which is constructed of graphite ceramic and which has a cylindrical axis of symmetry in which the material to be processed 80 is placed. The surfaces of anvils are spherically shaped, so that the shape of cavity 78 between the two anvils is close to spherical. This shape along with the centering rings assures centering of the container material. The graphite ceramic forming reaction cell 26 becomes heated when an electrical current is passed therethrough. The conductivity of the graphite ceramic material is considerably higher ($\sigma_\Omega \cong 10^{+3}$ (ohm·cm)$^{-1}$) than that of the container material ($\sigma_\Omega < 10^{-12}$ (ohm·cm)$^{-1}$). Reaction cell 26 is electrically connected to anvils by contacting units 82 which are also formed from graphite ceramics or from metal foil.

Figure 4:
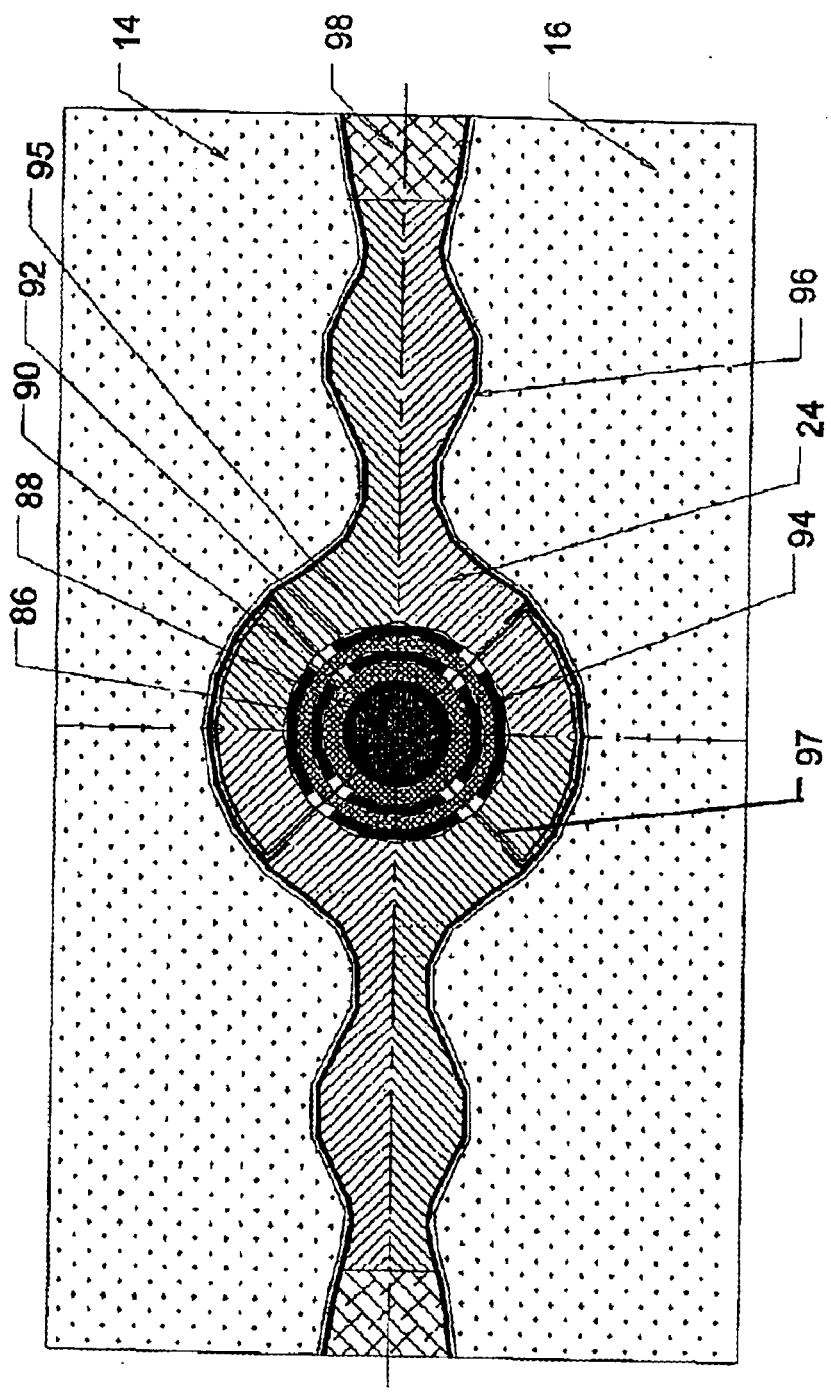
FIG. 4 is a sectional view of a reaction cell for use in the 20–5000° C. temperature range.

The design of a reaction cell for processing in the 20–5000° C. temperature range is shown in FIG. 4. The material 86 to be processed is located inside a cylindrical graphite ceramic heater 88 which is surrounded by a layer 90 of pure diamond powder, which insulates heater 88 from a first cylindrical graphite ceramic screen 92 which is concentric with heater 88. Screen 92 is insulated from a second graphite ceramic screen 94 by a layer of carbide powder 95, such as SiC or $B_4C$, which does not react with carbon over the temperature range existing between screens 92, 94 under steady state conditions. Screens 92, 94 serve to reflect the radiant heat while the diamond 90 and carbide 95 layers serve as electrical and chemical insulators preventing current passing trough the screens and chemical reactions between container 24 and heater 88 up to 5000° C. Screen 94 is located inside container 24 which again is made from plastic stone. A copper foil 96 is placed on the anvil walls 70, 72 and provides the electrical contact to heater 88 by means of graphite ceramic contacting units 97. A rubber ring 98 around the outside of container 24 regulates the pressure gradient in the container. This reaction cell permits melting material such as carbon under super high pressure in a static regime and in a relatively large volume.

Figure 5:
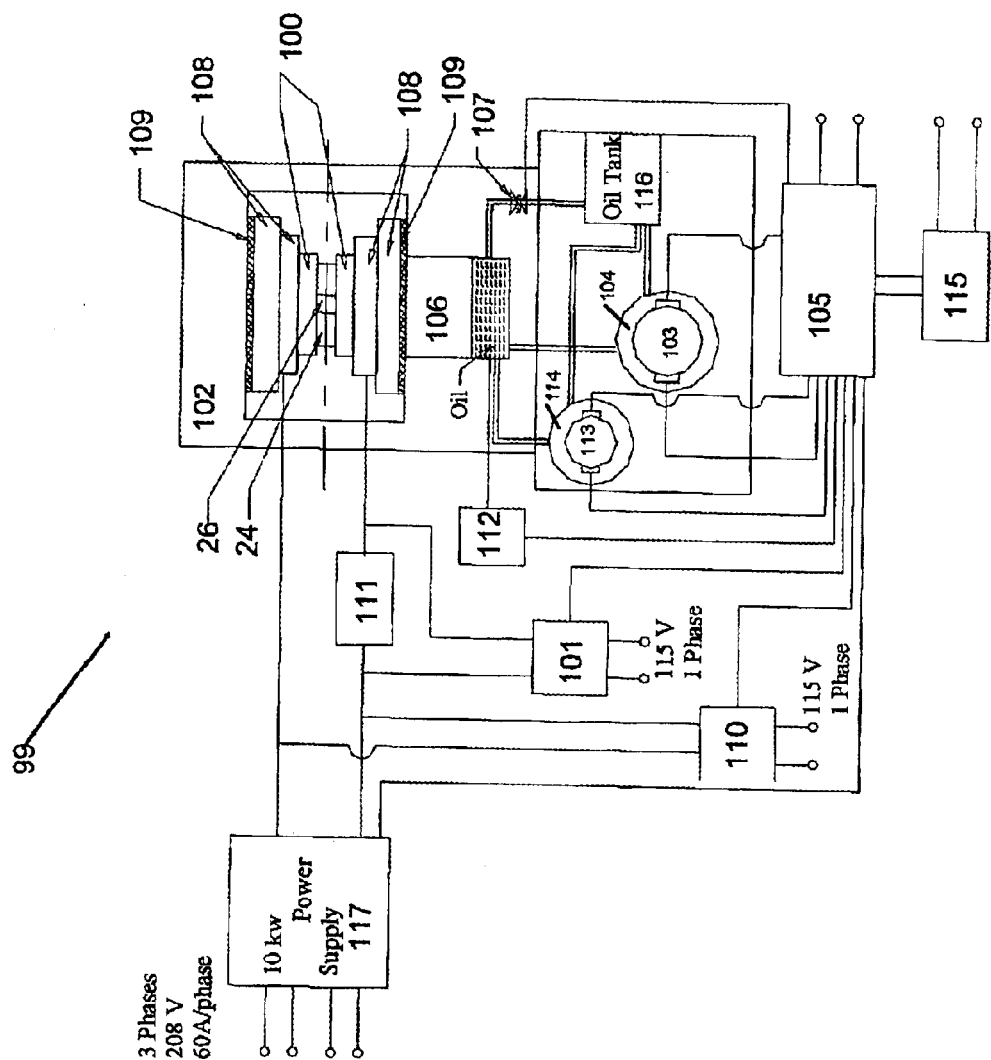
FIG. 5 illustrates schematically the control arrangement of the high pressure and temperature apparatus of the present invention.

The overall design of a high pressure/high temperature apparatus 99 is shown in FIG. 5; it consists of reaction cell 26 (as described above) inserted within container 24 of plastic stone disposed between anvils with supporting steel rings 100; inserts with supporting rings 108 and insulating layers 109. Apparatus 99 includes a frame 102, a hydraulic ram 106 with its associated oil tank 116 joined by an electrically operated valve 107. Hydraulic ram 106 is powered by an oil pump 104 operated by an electrical motor 103. Also acting on hydraulic ram 106 is a smaller (up to 500 bar oil pressure capabilities) oil pump 114 operated by an associated electrical motor 113. The uses of large and small oil pumps permits precision control of the operating pressure which is difficult with only a single pump. The apparatus is controlled by a controller 105 (such as a programmed logic controller) which in turn is operated by a computer 115. Operation of the apparatus is monitored by electrical multimeters 101 and 110 (such as Hewlett Packard HP 34401-A multimeters) and an oil pressure gauge 112. A 10 kilowatt power supply 117 operating through a high current 0.1 milliohm shunt 111 supplies the power to heat reaction cell 26 and oil pump motors 103, 113 and the other components are simply powered by 115 volt AC. Motors 103, 113, valve 107, oil pressure gauge 112, multimeters 101, 110 and power supply 117 are electrically joined with computer 115 through controller 105. Computer 115 monitors oil pressure-voltage-current-time parameters and provides control signals to motors 103, 113; valve 107, and power supply 117.

The present apparatus may also be used at pressures less than 1 Gpa depending on the needs of the material to be processed. Furthermore, the operating pressure can be increased to above 100 Gpa and the operating temperature increased above 5000° C. by dynamic methods.

The invention has been described with respect to preferred embodiments. However, as those skilled in the art will recognize, modifications and variations in the specific details which have been described and illustrated may be resorted to without departing from the spirit and scope of the invention as defined in the appended claims

What is claimed is:

1. A reaction cell for processing materials under high temperature and pressure comprising:
   a) a cylindrical graphite ceramic container for holding the material to be processed, said container becoming heated when an electrical current is passed therethrough;
   b) a first graphite screen spaced apart from and surrounding said container,
   c) first insulating material disposed between said container and said first screen;
   d) a second graphite screen spaced apart from and surrounding said first graphite screen;
   e) second insulating material disposed between said first screen and said second screen.

2. The reaction cell as claimed in claim 1 wherein the first insulating material comprises diamond powder.

3. The reaction cell as claimed in claim 1 wherein the second insulating material comprises carbide powder.

4. The reaction cell as claimed in claim 1 wherein the second insulating material comprises silicon carbide powder.

5. A high pressure/high temperature apparatus for material processing comprising:

a) a pair of confronting profiled anvils, said confronting profiled anvils forming a cavity therebetween;

b) a reaction cell for holding the material to be processed, said reaction cell being disposed in the cavity formed between the profiled anvils;

c) cylindrical inserts disposed above and below said anvils; and d) at least one annular supporting ring surrounding said profiled anvils.

6. The high pressure/high temperature apparatus as claimed in claim 5, wherein the reaction cell comprises a graphite crucible.

7. The high pressure/high temperature apparatus as claimed in claim 6, further including insulating material disposed about said graphite crucible.

8. The high pressure/high temperature apparatus as claimed in claim 5, further including second cylindrical inserts disposed above and below said first cylindrical inserts.

9. The high pressure/high temperature apparatus as claimed in claim wherein the anvils are constructed of a material that is harder than said first cylindrical inserts and said first cylindrical inserts are constructed of a material that is harder than said second cylindrical inserts.

10. The high pressure/high temperature apparatus as claimed in claim 5, wherein the anvils are constructed of a material that has a graded hardness with the hardest portion of the anvil located proximate to the reaction cell and the softest portion of the anvil located proximate to the cylindrical insert.

11. The high pressure/high temperature apparatus as claimed in claim 5, further including a second annular supporting ring surrounding said first annular supporting ring and a third annular supporting ring surrounding said second annular supporting ring.

12. The high pressure/high temperature apparatus as claimed in claim 11, wherein the first annular supporting ring is constructed of a material that is softer and more flexible than that of said anvils, the second annular supporting ring is constructed of a material that is softer and more flexible than that of said first annular supporting ring and the third annular supporting ring is constructed of a material that is softer and more flexible than that of said second annular supporting ring.

13. The high pressure/high temperature apparatus as claimed in claim 5, wherein the reaction cell comprises a cylindrical graphite ceramic container for holding the material to be processed, said container becoming heated when an electrical current is passed therethrough; a first graphite screen spaced apart from and surrounding said container, and a first insulating material disposed between said container and said first screen.

14. The high pressure/high temperature apparatus as claimed in claim 13, further including a second graphite screen spaced apart from and surrounding said first graphite screen; second insulating material disposed between said first screen and said second screen.

15. The high pressure/high temperature apparatus as claimed in claim 14, wherein the second insulating material comprises carbide powder.

16. The high pressure/high temperature apparatus as claimed in claim 13, wherein the first insulating material comprises diamond powder.

17. The high pressure/high temperature apparatus as claimed in claim 5, wherein the cavity formed by the confronting profiled anvils is generally spherical in configuration.

18. The high pressure/high temperature apparatus as claimed in claim 5, further including at least one annular supporting ring surrounding said cylindrical inserts.

* * * * *